United States Patent [19]

Wykhuis et al.

[11] 4,440,415
[45] Apr. 3, 1984

[54] HYDRAULIC LIFT ARM ASSEMBLY MOUNTING ARRANGEMENT

[75] Inventors: Lloyd A. Wykhuis; John B. Kuhn, both of Mayville, Wis.

[73] Assignee: Deere & Company, Moline, Ill.

[21] Appl. No.: 450,877

[22] Filed: Dec. 20, 1982

[51] Int. Cl.³ .............................................. B60D 1/00
[52] U.S. Cl. ................................. 280/460 A; 172/680
[58] Field of Search .......... 280/456 A, 460 A, 461 A, 280/503, 460 R; 56/15.9, 16.4, 208; 172/306, 464, 479, 668, 680

[56] References Cited

U.S. PATENT DOCUMENTS

| 2,495,928 | 1/1950 | Geraldson | 280/460 A |
| 3,269,748 | 8/1966 | Mazery | 280/461 A |

FOREIGN PATENT DOCUMENTS 167343  3/1954  Australia ............................ 280/503

Primary Examiner—David M. Mitchell
Assistant Examiner—D. Lynn Fugate

[57] ABSTRACT

A hydraulic lift arm assembly for vehicle including parallel sidewalls between which an axle tube is fixably mounted. The lift arm assembly is rotatably mounted around the axle tube.

3 Claims, 5 Drawing Figures

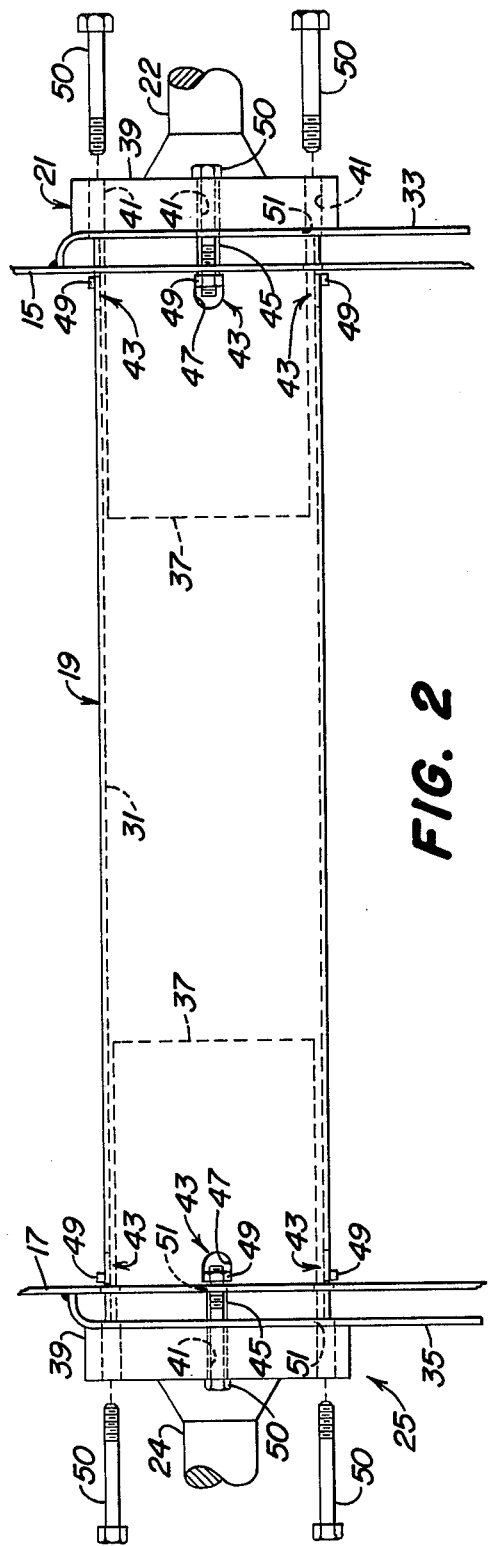
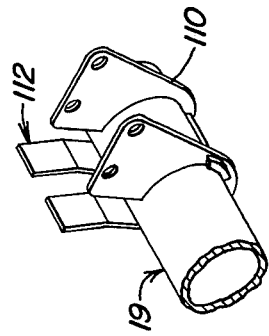
FIG. 2
FIG. 3a

HYDRAULIC LIFT ARM ASSEMBLY MOUNTING ARRANGEMENT

BACKGROUND OF THE INVENTION

This invention relates to the mounting arrangements for a hydraulic lift arm assembly particularly suited for employment on a vehicle having a unibody frame.

A unibody frame refers to the utilization of the body of a vehicle to function also as a structural element. As a result of torsional loading developed during operation of the vehicle, a unibody frame structure can experience early failure. The problem of torsional loads on a unibody frame vehicle, e.g., some types of lawn and garden tractors, is amplified when a working implement is supported by the vehicle.

It is possible to decrease the susceptibility of a unibody frame vehicle to torsional loading by employing vehicle components, such as the vehicle engine, as a stiffening agent for the vehicle. However, the use of vehicle components as a stiffening agent will require component hardening which will introduce significant increases in cost to the vehicle. Another means to reduce the susceptibility of a vehicle to torsional load is to provide independent stiffeners. It would also be advantageous to utilize the stiffeners as a support means for attached implements.

SUMMARY OF THE INVENTION

It is an objective of the present invention to present a means of attaching an implement to an independent stiffener of a unibody frame vehicle.

A unibody framed vehicle includes a portion having vertical opposite sidewalls. Extending between the sidewalls is an axle tube. Mounted in each end of the axle tube is a motor unit associated with a hydrostatic transmission system. Lift assemblies are pivotally mounted around the axle tube. Each lift assembly is comprised of a first and second lift arm pivotally mounted around the axle tube. The lift arms have a contoured extension to assume a spaced apart apart parallel alignment at one end located at the axle tube and abutting linear alignment at the other end. A hydraulic cylinder is pivotally mounted to the axle tube and to the lift arms. An implement can be attached to the lift assemblies.

BRIEF DESCRIPTION OF THE DRAWINGS

FIG. 2 is a elevated frontal view of the axle tube.

FIG. 3a is a partial perspective view of the pivot linkage of the lift arm assembly.

DESCRIPTION OF THE PREFERRED EMBODIMENT

Figure 1:
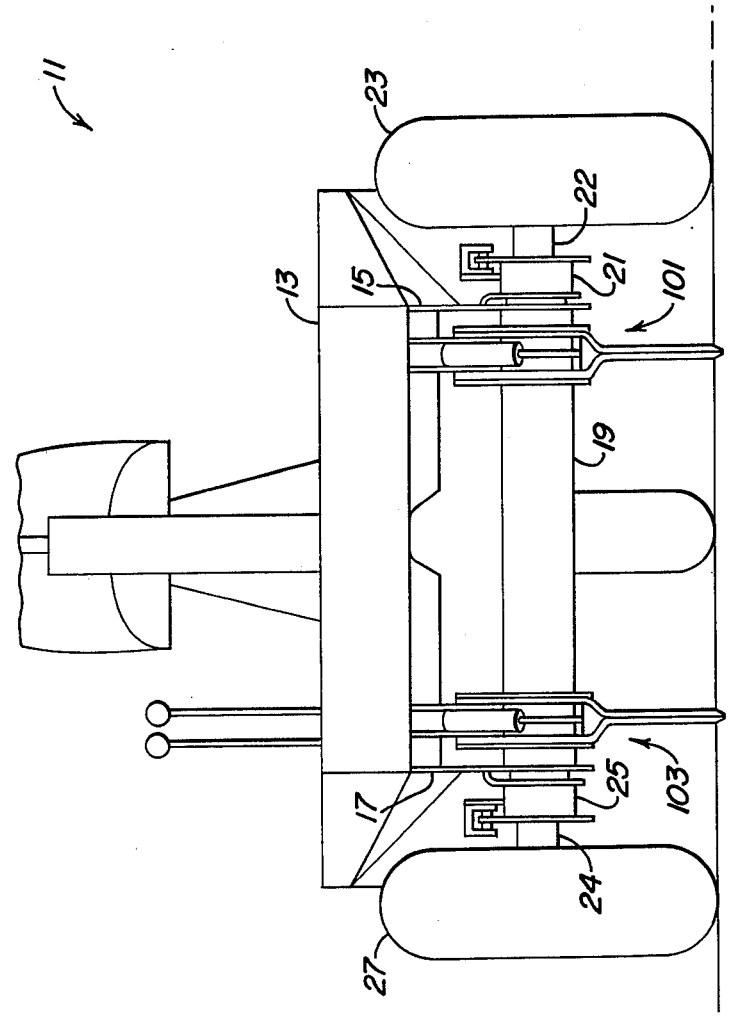
FIG. 1 is a front elevated view of a lawn and garden tractor employing a unibody frame.

Referring to FIG. 1, a vehicle, generally indicated as 11, has a unibody frame section 13. The unibody frame section 13 includes a right drive wheel mounting wall 15 and a left drive wheel mounting wall 17 as viewed in FIG. 1. An axle tube 19 extends between and is received in the right and left walls 15 and 17 respectively. A right hydraulic motor 21 is fixably mounted by any method in the right hand side of the axle tube 19. The hydraulic motor 21 includes a motor axle 22 extending to a drive wheel 23 and thereto mounted in a conventional manner. A left hydraulic motor 25 is fixably mounted by any method into the left-hand end of the axle tube 19 and includes a motor axle 24 which is fixably mounted by a conventional means to a left drive wheel 27. The axle tube 19 has pivotally mounted thereto in spaced apart relation a right and left lift arm assembly 101 and 103, respectively to be described subsequently.

Referring now more particularly to FIG. 2, the axle tube 19 extends through the frame walls 15 and 17 at its respective ends to abut outwardly located pilot flange 33 fixably mounted to frame wall 15 and flange 35 fixably mounted to frame wall 17. The axle tube 19 defines an open-ended, elongated chamber 31. The hydraulic motors 21 and 25 each contain a base housing 37 sized to be received in the chamber 31 of the axle tube 19, passing through the respective pilot flange 33 or 35. Each motor base housing 37 has a flanged lip 39 at its end which abates the respective pilot flange 33 or 35. Each flange lip 39 has a plurality of transverse passageways 41 spaced about the flange lip 39. The pilot flanges 33 and 35 also have a plurality of passageways 51 which are cooperatively aligned to a plurality of keyways 43 which are spaced around respective ends of the axle tube 19 and passageways 41 in respective flange lips 39.

Each keyway 43 is comprised of the first and second sections 45 and 47, respectively. The first section 45 extends from a respective end of tube 19 to experience a step increase in width to section 47 to create an abutting surface within the keyways 43. The width of the second section 47 is mating to the minimum diameter of a nut 49. The nut 49 is placed in the section 47 such that the nut 49 cannot experience rotational motion within the particular keyway section 47 and to abut the surface created by the transition of keyway section 45 to section 47. For mounting of the motors 21 and 25, bolts 50 are journaled through the respective passageways 41, 51 and into the keyway 43 to be secured threadably in a respective nut 49.

Figure 3:
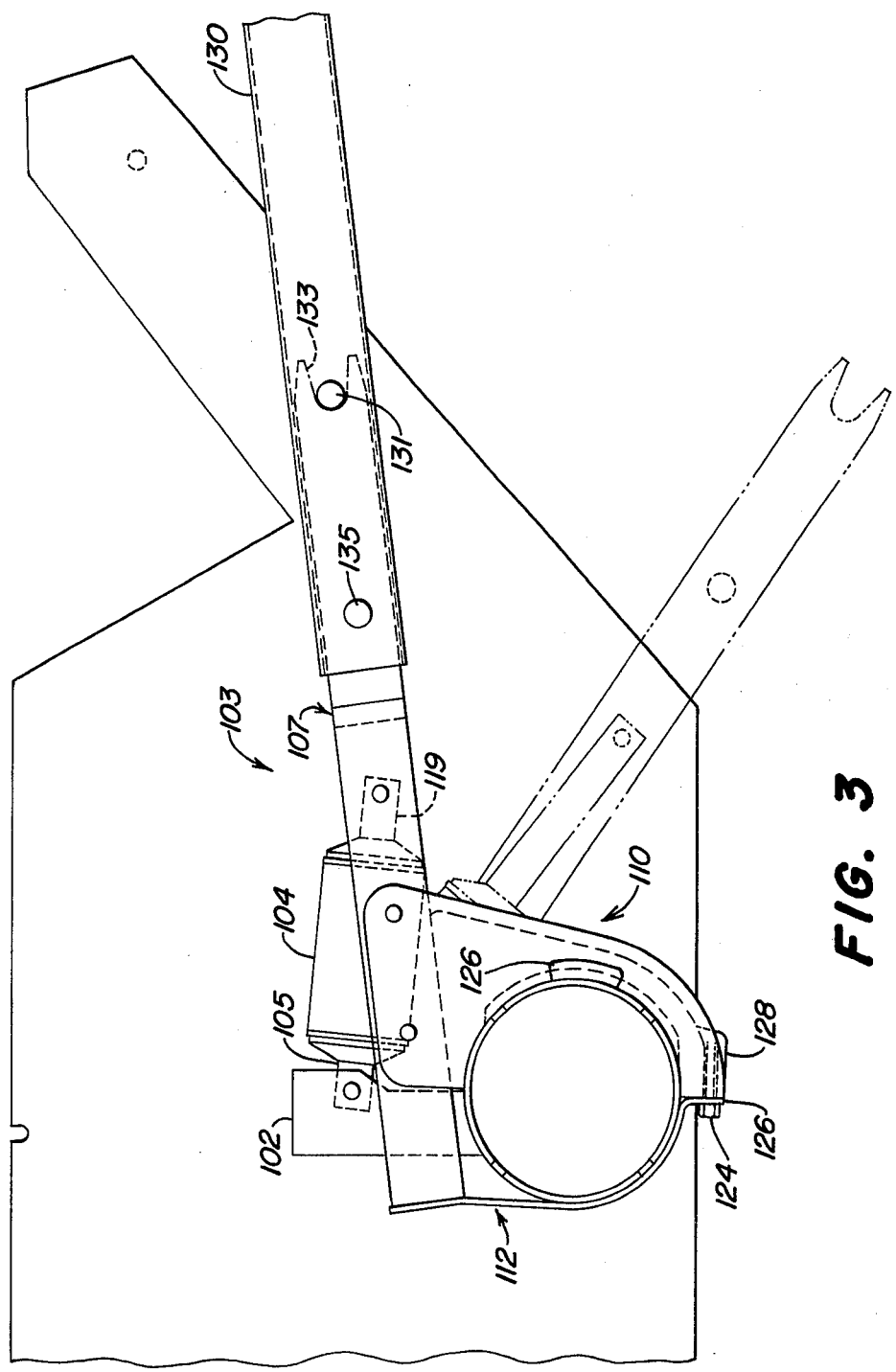
FIG. 3 is a schematic side elevated view of the axle tube and a lift arm assembly.
Figure 4:
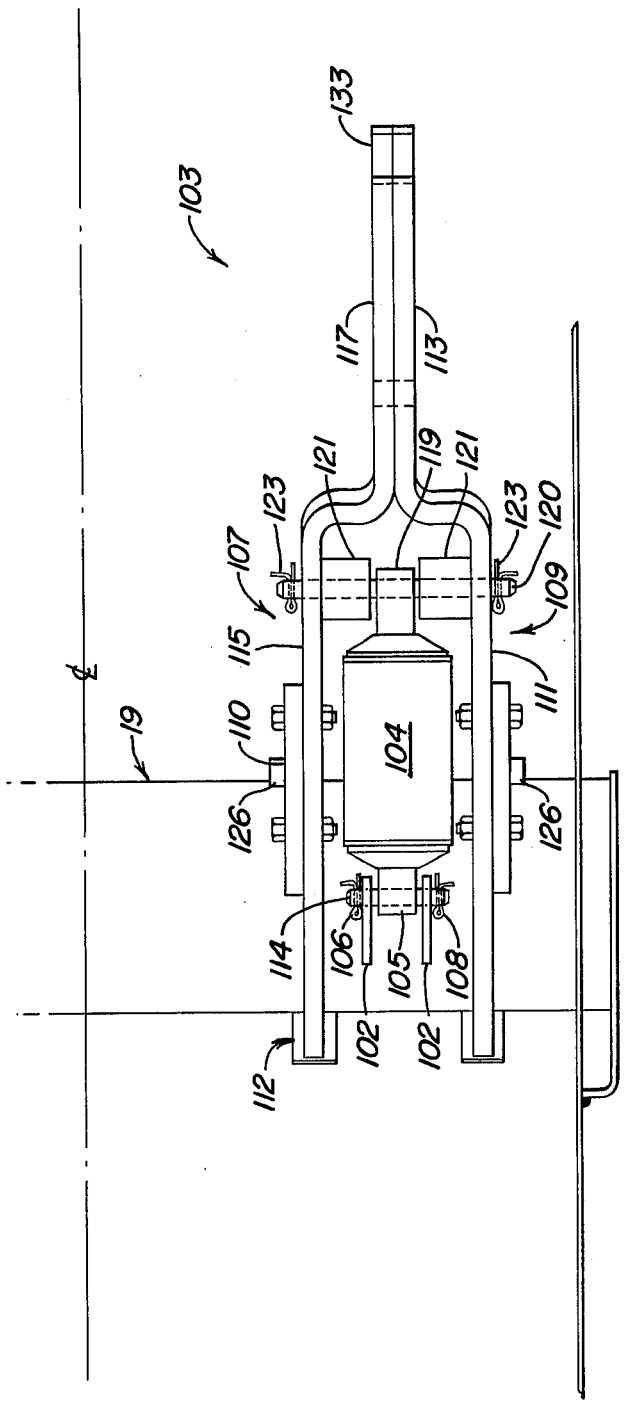
FIG. 4 is a top plan view of the lift arm assembly.

Referring now to FIGS. 3, 3a and 4, the lift assembly 101 is identical to lift assembly 103; therefore only the left lift assembly 103 will be described herein in detail. The lift assembly 103 includes cylinder mounting arms 102 fixably mounted to axle tube 19 in spaced apart relationship by any conventional means such as welding. Mounting arms 102 are not shown in FIG. 3a for the purpose of clarity. A hydraulic cylinder 104 has a mount nipple 105 at one end. The mounting nipple 105 is placed between mounting arms 101, and a pin 114 is passed through the mounting arms 101 and nipple 105 for pivotally mounting of the cylinder 104. The pin 114 can be maintained in the mounting arms 102 by any conventional means such as by passing cotter clips 108 and 106 through respective ends of pin 114. A first lift arm 107 has a generally S-shape and includes a first section 115 leading to a second section 117. A second lift arm 109 has a generally S-shape and includes a first section 111 leading to a second section 113. The lift arms 109 and 107 are pivotally mounted around the axle tube 19 such that lift arm sections 111 and 115 are in spaced apart relationship with the cylinder 104 located therebetween, and sections 113 and 117 are in coextending abutting alignment.

Each lift arm 107 and 109 has a spacer member 121 in opposite alignment fixably mounted by any conventional means to respective lift arm sections 111 and 115. A pin 120 extends through sections 115, 111, spacers 121 and the cylinder rod 119 of hydraulic cylinder 104 to pivotally mount the cylinder rod 119 to the arms 107 and 109. The pin 120 is maintained by any conventional means such as by cotter pins 223.

In the preferred embodiment of the present invention, the lifts arms 107 and 109 are pivotably supported on axle tube 19 by an assembly including a first member 110 having a generally C-shaped side view configuration with a yoke-like upper portion when viewed frontally and a similar second member 112 having a generally C-shaped side view configuration with a yoke-like upper portion when viewed frontally. The members 110 and 112 are placed around axle 19 to encircle a portion of axle 19. Member 110 is fixably mounted to member 112 below axle tube 19 at one end by any conventional means such as by passing a bolt 124 through a flange portion 126 of member 112 to threadably seat in an abutting portion 128 of member 110. The lift arm sections 111 and 115 of respective lift arms 109 and 107 are received between the yoke portion of member 110, and abut the upper yoke portion of member 112. The lift arm sections 111 and 115 are fixably mounted to respective yoke portions of members 110 and 112 above axle tube 19 by any conventional means such as by bolts or welding. To either side of member 110 is fixably mounted by any conventional means a stop 126 to longitudinally restrain the lift assembly 103.

To mount an implement (not shown), the implement can include tubular support arms 130 having a cross pin 131. The lift arm sections 113 and 117 are received within the tubular support arm 130 such that pin 131 is received in a seat 133 cooperatively formed at the end of lift arm sections 113 and 117. To restrain the lift arms 113 and 117, a pin 135 is passed through lift arm sections 113 and 117 and tubular support arm 130. It is appreciated that cooperative motion of the hydraulic cylinder rods 119 causes the lift arm assemblies 101 and 103 to pivot, resulting in raising and lowering of an implement attached to tubular support arms 130.

We claim:

1. In combination with a unibody frame structure having an axle tube extending longitudinally between opposing sidewalls of said unibody frame structure, a lift assembly pivotally mounted to the axle tube, said lift assembly comprising: a first generally S-shaped lift arm; a second generally S-shaped lift arm, first means for rotatably mounting said lift arms around said axle tube such that said lift arms are in spaced apart relationship in the region in close proximity to said axle tube and in abutting parallel alignment at the other end; a hydraulic cylinder having a displaceable cylinder arm, said cylinder arm being pivotally mounted to said lift arms in said region in spaced apart relationship; and, second means for pivotally mounting said hydraulic cylinder to said axle tube between said lift arms in said spaced apart region.

2. A combination as claimed in claim 1, wherein said first means comprises a first member having a generally C-shaped side configuration of a discreet width and having a yoke-like upper section along the upper width; said lift arm being fixably mounted to said yoke section of said first member to maintain said region of said lift arms in spaced apart alignment at one end; a second member having a generally C-shape, said first and second member fixably mounted together at one end to be around said axle tube.

3. A combination as claimed in claim 2 further comprising means to restrict said lift assembly from experiencing lateral motion along said axle tube.

* * * * *